Sept. 20, 1949.  A. K. GAETJENS  2,482,410
ILLUMINATED DIAL HAVING POLARIZING ELEMENTS
Filed July 3, 1944  2 Sheets-Sheet 1
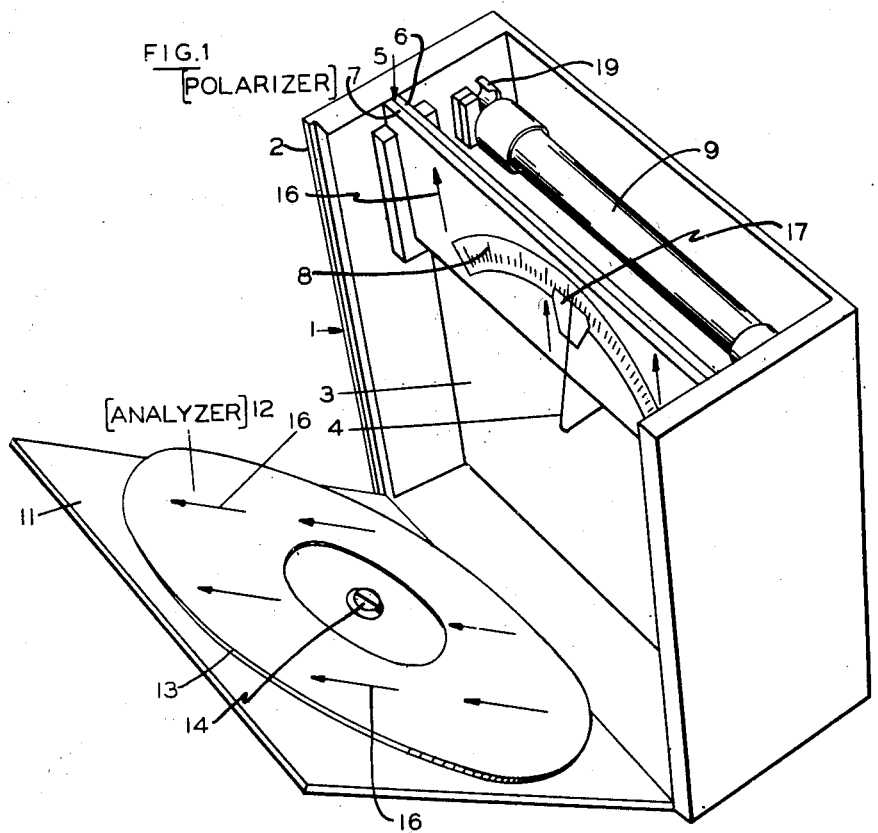
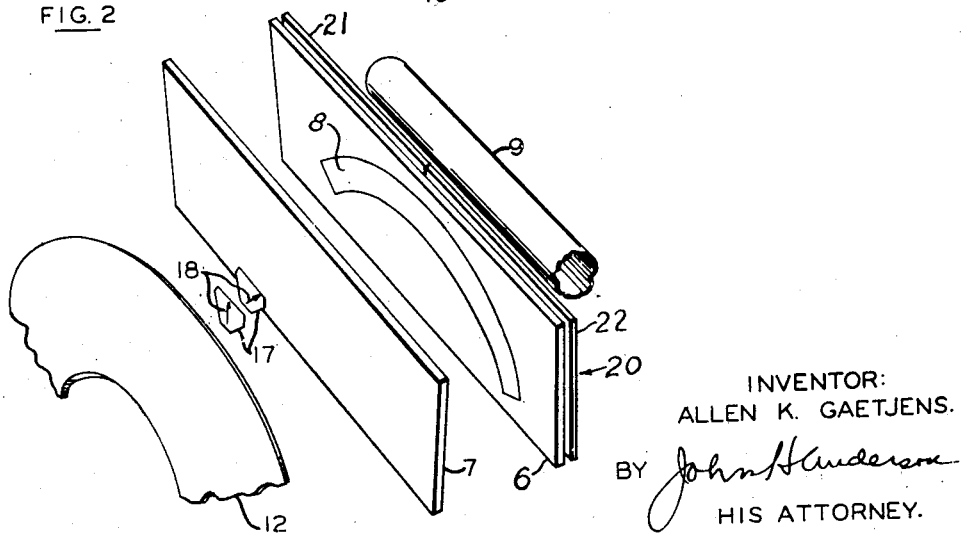
INVENTOR:
ALLEN K. GAETJENS.
BY John H Anderson
HIS ATTORNEY.

INVENTOR:
ALLEN K. GAETJENS,
BY John H Anderson
HIS ATTORNEY.

UNITED STATES PATENT OFFICE 2,482,410

ILLUMINATED DIAL HAVING POLARIZING ELEMENTS

Allen K. Gaetjens, Cleveland Heights, Ohio, assignor to General Electric Company, a corporation of New York Application July 3, 1944, Serial No. 543,405

2 Claims. (Cl. 88—65)

My invention relates to illuminated dials and its principal object is to provide a simple, easily operable apparatus for controlling the visibility of such dials, whereby the apparent brightness and the size of the visible portion of the dial may be selected by the user to suit various service conditions without changing the light output of the lamp illuminating the dial. Another object of the invention is to provide an illuminated dial for an indicating apparatus which is easily read at night without substantially changing the "dark adaptation" of the eyes of the reader, such as a locomotive engineer or an aircraft pilot, and which is of good visibility in the daytime. Further objects and advantages of my invention will appear from the following detailed description of species thereof and from the appended claims.

A feature of my invention is a light control system for illuminated dials, which system is mounted on the side of the dial to be viewed and comprises a pair of light polarizing screens mounted for relative rotary displacement so that the apparent brightness of the illuminated dial may be selected to suit the user. A further feature of my invention is a member of optically active material mounted between the polarizing screens and on the portion of the pointer or needle opposite the dial to give visibility to the portion of the dial behind said member when the polarizing screens are "crossed," that is, when one screen is positioned so as to transmit light vibrating only in one plane, such as a vertical plane, and the other is positioned so as to transmit light vibrating only in a plane perpendicular to the first plane, such as a horizontal plane.

Figure 3:
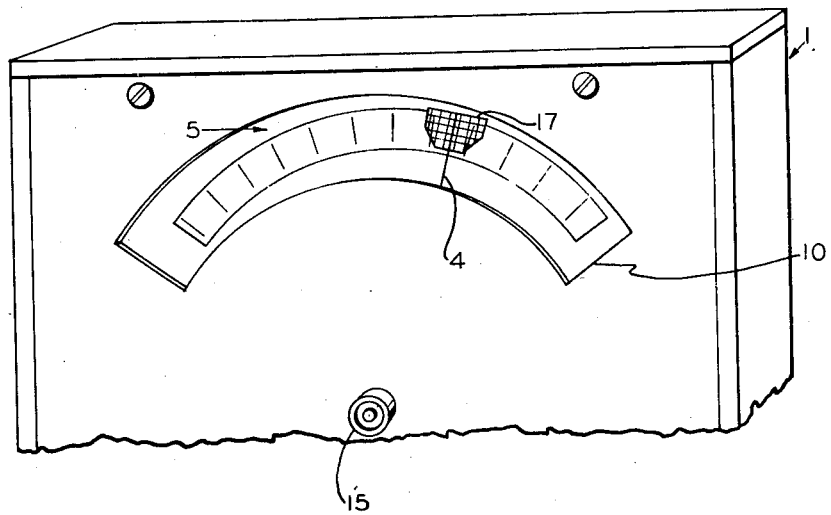
Figure 4:
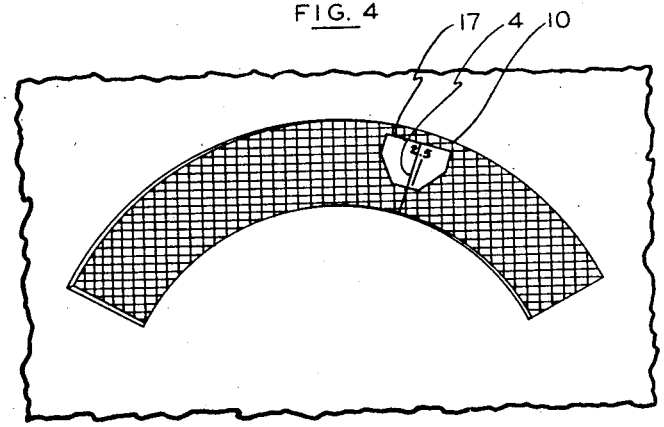

In the drawing accompanying and forming part of this specification an embodiment of my invention is shown in which Fig. 1 is a perspective view of an electrical indicating meter, or the like, equipped with an illuminated dial embodying my invention, Fig. 2 is an exploded, perspective view of the light control system and the illuminated dial of my invention, Fig. 3 is a fragmentary, perspective view of the meter shown in Fig. 1 with the top and front panel in place and showing the appearance of the illuminated dial in one position of the light control elements and Fig. 4 is a similar view of the meter showing the appearance of the illuminated dial in another position of the light control elements.

Referring to Fig. 1 of the drawing the indicating meter 1 comprises a housing 2 having a partition 3 dividing its interior into a front compartment and a lower rear compartment accommodating the conventional control apparatus (not shown for purposes of simplicity of illustration) of an indicating needle or pointer 4 which extends from the rear compartment, through the partition 3 and into the front compartment. The needle 4 terminates opposite a dial 5 which comprises a translucent, diffusing glass plate 6 and a thin, transparent strip 7 of light polarizing material. The strip 7 will be referred to hereinafter as the polarizer 7. The diffusing glass plate 6 is provided with a plurality of spaced opaque lines or calibrations 8 arranged in a circular arc behind the path of travel of the free end portion of the needle 4. The calibrations 8 may be placed on the surface of polarizer 7 facing diffuser 6, when desired. The dial 5 is illuminated by a tubular lamp 9 mounted behind the said dial 5. The opaque lines 8 appear dark against the luminous background provided by the illuminated diffusing plate 6 and the needle 4 also appears dark against the said luminous background so that the position of the needle relative to the lines 8 of the dial 5 may be plainly seen through an arcuate opening 10 in the front panel 11 of the housing 2, as shown in Fig. 3.

The brightness of the illuminated dial 5 and the visibility thereof through the aperture 10 is controlled to suit the needs of the user in the daytime or nighttime by a thin, transparent, annular, light polarizing sheet 12 mounted on a transparent, rotatable annular disk 13 which is supported by the bearing 14 secured to the housing panel 11. The bearing 14 is provided with a knob 15 (Fig. 3) by which disk 13 may be rotated to move selected portions thereof and the sheet 12 across the viewing opening 10. The light polarizing sheet 12 is hereinafter referred to as the analyzer 12.

The polarizer 7 and the analyzer 12 transmit light vibrating in a plane. The arrows 16 associated with the polarizer 7 and the analyzer 12 indicate that these elements in the relative position shown in Fig. 1 have their planes of polarization parallel and transmit only that light emitted by lamp 9 which is vibrating in a vertical plane. The analyzer 12 and the polarizer 7 each may comprise small polarizing bodies oriented so that their polarizing axes are parallel. Such material, known as "Polaroid" is available commercially and may be cemented to the diffuser 6 and the disk 13.

When the polarizer 7 and the analyzer 12 are in the position shown in Fig. 1, that is, with their planes of polarization parallel, the dial 5, illuminated by lamp 9, is at its maximum brightness and, together with needle 4, is clearly visible even in daylight through the aperture 10, as shown in Fig. 3. The brightness of the dial 5, as seen through the aperture 10, may be reduced to suit service conditions of the meter 1 by rotating analyzer 12 to angularly displace the plane of polarization of the latter with respect to that of the polarizer 7. As the two planes of polarization are progressively displaced through an increasing angular distance from their parallel positions to a position perpendicular or normal to each other, the analyzer 12 transmits less and less of the light polarized by the polarizer 7 and the apparent brightness of the dial 5, as seen through aperture 10, diminishes. When the said planes of polarization are perpendicular or normal to each other, that is, when the analyzer 12 has been rotated 90 degrees, the analyzer 12 and the polarizer 7 are said to be "crossed" and, if a special means is not provided, no part of the dial 5 is visible through the aperture 10.

In accordance with my invention, however, a special means is provided for making the portion of the dial 5 behind the free end portion of the needle 4 visible through aperture 10 when the analyzer 12 and the polarizer 7 are crossed. The appearance of the dial 5 through aperture 10 when such means is provided is shown in Fig. 4 of the drawing. The visible portion of the dial 5 is of low brightness and small size and is eminently satisfactory for use by a vehicle operator in the dark since the eye of the operator is not dazzled even when it is "dark-adapted," nor is the "dark-adaptation" of the eye changed appreciably by the low brightness and small size of the visible portion of the dial 5.

The means for making a portion of the illuminated dial 5 visible when the analyzer 12 and the polarizer 7 are crossed comprises a member 17 of optically active material mounted on the portion of the needle 4 opposite dial 5. The member 17 rotates the plane of vibration of the polarized light through an angle such that a portion of the polarized light is transmitted by the analyzer 12 even when the latter is in its crossed position with respect to polarizer 7. Thus, the portion of dial 5 behind the member 17 is visible when the other portions of the dial 5 are not visible through the aperture 10.

I prefer to make member 17 of two sheets of viscose transparent birefringent material cemented together with their crystalline axes at an angle of approximately 45 degrees with respect to each other, as indicated by the arrows 18 in Fig. 2. I have demonstrated that, when the crystalline axis of each sheet is so oriented with the crystalline axis of the other sheet, the portion of the dial 5 behind body 17 is visible through the crossed analyzer 12 in any position of free end of needle 4. I have demonstrated further that so long as the crystalline axes of the sheets are at the proper angle with respect to each other, their angular position relative to the plane of polarization of the polarizer 7 makes no difference in the effect produced by the member 17. That is, the member 17 may be rotated 360 degrees about an axis normal to its surface and the portion of the dial 5 behind it will be visible through the aperture 10 and the crossed analyzer 12 in any angular position of the member 17. Thus, the dial 5 may be made in the form of a circle and the needle 4 may be arranged to traverse an angular distance of 360 degrees. Sheets approximately 0.001 inch in thickness are effective for the purposes of the invention.

In some instances it is desirable to make the member 17 of small dimensions because it appears black against the luminous dial 5 when the analyzer 12 is disposed with its plane of polarization parallel to that of the polarizer 7, as shown in Fig. 3. Thus, when maximum brilliance of the dial 5 is desired, for easy reading in brightly illuminated surroundings for example, the member 17 may be in the shape of a jewel and of small size so as to obscure but a small portion of the dial 5 under such conditions and thus to facilitate accurate reading of the meter 1. However, when less than maximum brilliance of the dial 5 will suffice for reading purposes the analyzer 12 may be arranged with its plane of polarization at an angle of approximately 45° instead of parallel to that of the polarizer 7. The dial 5 is then clearly visible, including the portion thereof behind the member 17. When desired, a portion of disc 13 large enough to cover aperture 10 may be left bare of polarizing material so that maximum brightness of dial 5 may be obtained. Member 17 then does not appear dark against dial 5.

The lamp 9 shown in Figs. 1 and 2 is a tubular, fluorescent, discharge lamp similar to that disclosed and claimed in United States Patent 2,182,732, issued December 5, 1939, and is supported by a socket 19 at each end. Such lamps are commercially available and I prefer one known as the 4 watt, T-5, white fluorescent lamp. I prefer to mount the usual lamp ballast outside the housing 1 since it emits some heat. One or more incandescent lamps may be used in place of the fluorescent lamp 9.

Frequently, in using indicating meters it is desirable to have different portions of the dial of different colors to facilitate rapid reading. Thus, a screen or filter 20 having zones or portions 21 and 22 transmitting light of different color may be disposed between the lamp 9 and the polarizer 7, with the zones 21 and 22 transmitting different colored light behind different sections of the dial 5 as shown in Fig. 2. Thus, when the analyzer 12 is crossed with respect to the polarizer 7 the member 17 will transmit the distinctively colored light passing through the portion of the screen 20 behind the member 17 and thus the reader of the meter 1, familiar with the location of the zones 21 and 22 of different color, can ascertain at a glance by the color of the light the approximate location of the needle 4 with respect to the dial 5.

What I claim as new and desire to secure by Letters Patent of the United States is:

1. A dial comprising a translucent diffusing plate having opaque calibrations positioned in an arcuate path on one face thereof, a polarizer covering said face for polarizing light transmitted by the plate, an opaque pointer pivoted with its free end opposite the calibrated portion of the plate and movable in an arcuate path in a plane transverse to the path of the polarized light, a flat optically active member substantially smaller than the calibrated portion of the plate mounted on the free end of the pointer opposite the said calibrated portion and transverse to the path of travel of the polarized light for rotating the plane of vibration of the polarized light incident thereon and consisting of two sheets of transparent birefringent material having their crystalline axes at an angle of approximately 45° to each other, an analyzer screen in the path of the polarized light from the polarizer and the said member and through which the pointer and the calibrated portion of the plate are visible and means supporting said analyzer and said pointer in spaced relation to each other and to said plate and said polarizer, said analyzer being mounted for rotation on said means into a first position in which it passes the polarized light coming directly from the polarizer and not that transmitted by the optically active member so that the part calibrated portion of the plate except the part thereof behind the said member is visible through the analyzer, a second position in which it passes both the said direct and the said transmitted light so that the entire calibrated portion of the plate is visible through the analyzer and a third position in which it passes the transmitted light in any angular position of the pointer in its arcuate path and not the said direct light so that only that part of the calibrated portion of the plate behind the said member is visible through the analyzer.

2. A dial comprising a translucent diffusing plate having zones of different color, opaque calibrations positioned in an arcuate path on one face of the plate and in said zones, a polarizer covering said face for polarizing light transmitted by the plate, an opaque pointer pivoted with its free end opposite the calibrated portion of the plate and movable in an arcuate path in a plane transverse to the path of the polarized light, a flat optically active member substantially smaller than the calibrated portion of the plate mounted on the free end of the pointer opposite said calibrated portion and transverse to the path of travel of the polarized light for rotating the plane of vibration of the polarized light incident thereon and consisting of two sheets of transparent birefringent material having their crystalline axes at an angle of approximately 45° to each other, an analyzer screen in the path of the polarized light from the polarizer and the member and through which the pointer and the calibrated portion of the plate are visible, and means supporting said analyzer and said pointer in spaced relation to each other and to said plate and said polarizer, said analyzer being mounted for rotation on said means into a first position in which it passes the polarized light coming directly from the polarizer and not that transmitted by the optically active member so that the calibrated portion of the plate except the part thereof behind the said member is visible through the analyzer, a second position in which it passes both the said direct and the said transmitted light so that the entire calibrated portion of the plate is visible through the analyzer and a third position in which it passes the said transmitted light in any angular position of the pointer in its arcuate path and not the said direct light so that only that part of the calibrated portion of the plate behind the said member is visible through the analyzer.

ALLEN K. GAETJENS.

REFERENCES CITED

The following references are of record in the file of this patent:

UNITED STATES PATENTS

| Number | Name | Date |
| --- | --- | --- |
| 1,272,396 | Dixon et al. | July 18, 1918 |
| 1,354,932 | Wilson | Oct. 5, 1920 |
| 1,997,628 | Chubb | Apr. 16, 1935 |
| 2,105,671 | Roesch | Jan. 18, 1938 |
| 2,123,743 | Pratt | July 12, 1938 |
| 2,165,974 | Land | July 11, 1939 |
| 2,169,022 | Chubb | Aug. 8, 1939 |
| 2,174,269 | Land | Sept. 26, 1939 |
| 2,184,138 | Corey | Dec. 19, 1939 |
| 2,192,860 | Bennett et al. | Mar. 5, 1940 |
| 2,237,565 | Land | Apr. 8, 1941 |
| 2,262,920 | Carbonara | Nov. 18, 1941 |
| 2,311,840 | Land | Feb. 23, 1943 |
| 2,313,923 | Chubb | Mar. 16, 1943 |
| 2,347,582 | Ulffers | Apr. 25, 1944 |
| 2,351,797 | Young | June 20, 1944 |
| 2,393,970 | Burchell et al. | Feb. 5, 1946 |
| 2,404,746 | Rylsky et al. | July 23, 1946 |
| 2,427,896 | Bradley | Sept. 23, 1947 |